United States Patent

[11] 3,619,081

[72] Inventors Casimir F. Gruska
Chicago;
William Lelyk, Medinah, both of Ill.
[21] Appl. No. 881,972
[22] Filed Dec. 4, 1969
[45] Patented Nov. 9, 1971
[73] Assignee American Home Products Corporation
New York, N.Y.

[54] BEATER FOR COMESTIBLES AND THE LIKE
2 Claims, 8 Drawing Figs.
[52] U.S. Cl. .................................................. 416/70,
416/240, 416/132, 416/142
[51] Int. Cl. ..................................................... B01f 7/16,
B01f 9/12
[50] Field of Search............................................ 416/132,
70, 72, 75, 173, 76, 77, 240; 259/DIG. 28, DIG.
29, DIG. 35; 145/53

[56] References Cited
UNITED STATES PATENTS
| 1,290,489 | 1/1919 | Bauer............................ | 145/53 |
| 2,778,615 | 1/1957 | Hahn............................. | 416/240 |
| 3,215,410 | 11/1965 | McMaster et al............. | 416/240 |

FOREIGN PATENTS
| 887,482 | 1/1962 | England ....................... | 259/DIG. 29 |
| 1,024,943 | 2/1949 | France .......................... | 416/240 |

*Primary Examiner*—Martin P. Schwadron
*Assistant Examiner*—Clemens Schimikowski
*Attorneys*—Robert D. Teichert and Donald J. Koprowski

ABSTRACT: A one-hand beater for comestibles and the like is provided with a relatively flexible plastic mixing element having mixing fingers, each of which radiates outwardly and upwardly from a hub and terminates spaced apart from said hub at its top end, and means for more simply, efficiently and economically securing a shaft to the handle of the beater.

PATENTED NOV 9 1971

Inventors
Casimir F. Gruska
William Lelyk
By Ronald J. K. ??
Attorney

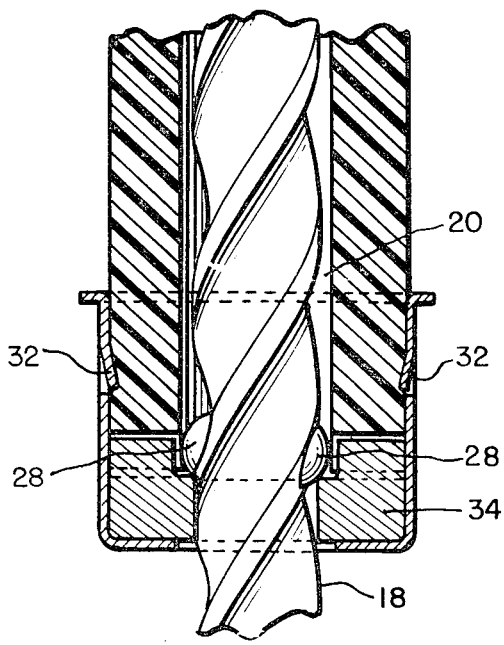
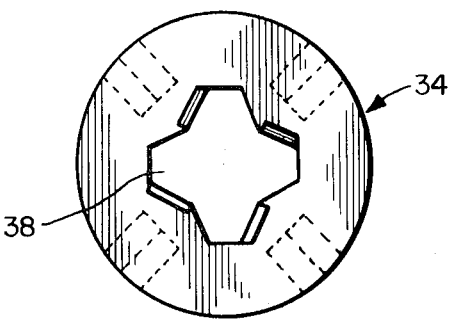
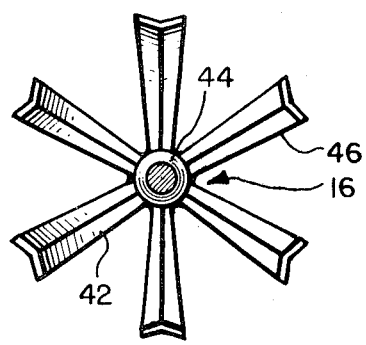
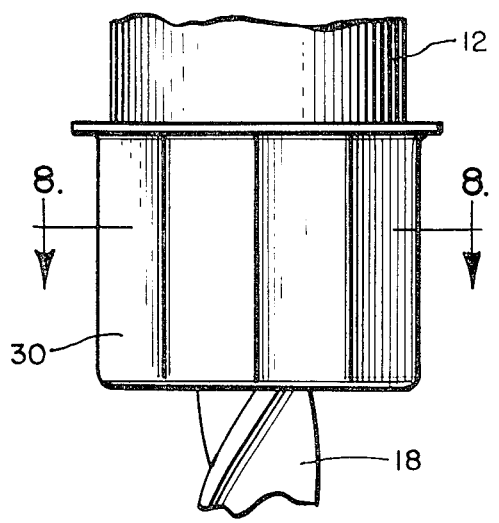
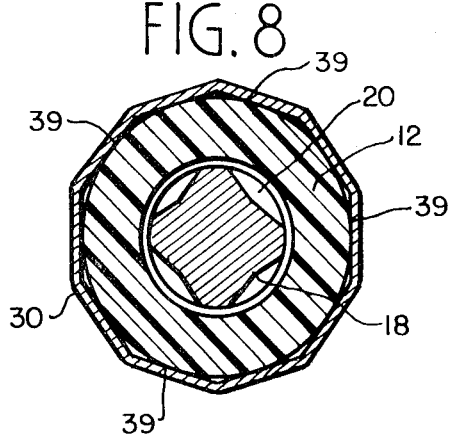
Inventors
Casimir F. Gruska
William Lelyk
By *Donald J. Kfennedi*
Attorney 3,619,081

BEATER FOR COMESTIBLES AND THE LIKE

BACKGROUND OF THE INVENTION

This invention relates generally to one-hand beaters for mixing small amounts of comestibles and the like, such as a few ounces of cream or egg whites, and particularly to an improved plastic mixing element and a new and improved means for securing a drive shaft to a plastic beater handle.

Heretofore it has been common practice in beaters to include a mixing element having fingers joined at both the top and the bottom to a rotatable shaft. Such beater elements have failed to provide adequate mixing action, especially because of the rigidity effected by the joinder of the fingers at both top and bottom. Such beaters have also been very difficult to clean.

It has been also common practice in beaters of this type to secure the rotatable shaft to a wood beater handle by trapping a bearing having teeth between a ferrule and the end of the handle. In assembling the beater, the ferrule would have to be forced up against the bearing and the teeth of the bearing in turn would bite into the end of the handle to prevent rotation of the bearing during operation of the beater. The ferrule would then have to be crimped to fasten it securely to the wooden handle.

This invention contemplates the provision of a plastic beater element which greatly enhances mixing efficiency and which is substantially easier to clean. It also contemplates the provision of a fastening assembly that is simple, efficient and economical.

SUMMARY OF THE INVENTION

A plastic mixing element is provided with V-shaped flexible fingers that radiate outwardly from a central shaft, then curve upwardly in a substantially vertical direction. The fingers are not joined to the top of the hub but are free to flex and whip as the beater element is rotated. This, along with the sharp edges and corner of the V-shape cross section of the fingers provides the enhanced mixing action. Because of the ample space between the top of the fingers and the shaft, the beater element is much easier to clean than those in the prior art.

The lower end of the plastic beater handle is provided with a circular row of notches into which the teeth of the bearing snugly fit. The ferrule is also provided with a plurality of barbs or other means for securing the ferrule to the handle. In assembling the beater it is only necessary to force the ferrule over the lower end of the plastic handle. The teeth of the bearing then fit into the notches of the handle without and necessity for orientation of the bearing and the bearing is thus prevented from rotating during operation of the beater. Because of barbs on the ferrule bite into the plastic handle and secure it firmly thereto when the ferrule is press-fitted into the handle, the necessity for crimping the ferrule after assembly is eliminated.

DESCRIPTION OF THE DRAWINGS

FIG. 4 is an enlarged cross-sectional view taken substantially along line 4—4 of FIG. 1.

FIG. 5 is a cross-sectional view taken along line 5—5 of FIG. 3.

FIG. 6 is a plan view of the mixing element of this invention, taken as shown by line 6—6 of FIG. 1.

FIG. 7 is an elevational view of an alternate embodiment of the ferrule of the beater.

FIG. 8 is a cross-sectional view taken along line 8—8 of FIG. 7.

DESCRIPTION OF THE PREFERRED EMBODIMENTS

Figure 1:
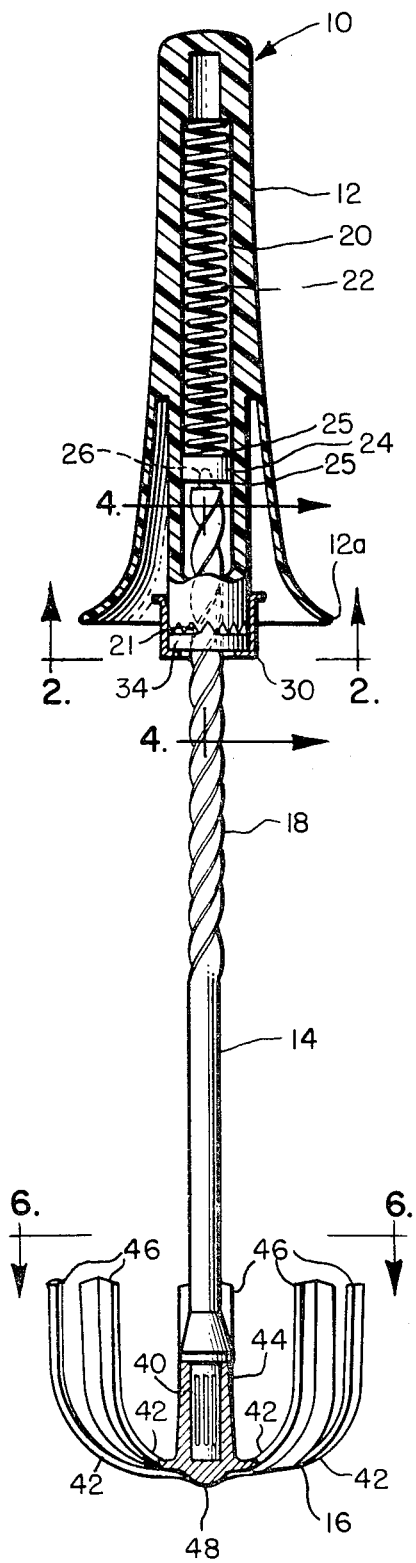
FIG. 1 is a cutaway elevational view of a beater of this invention.
Figure 2:
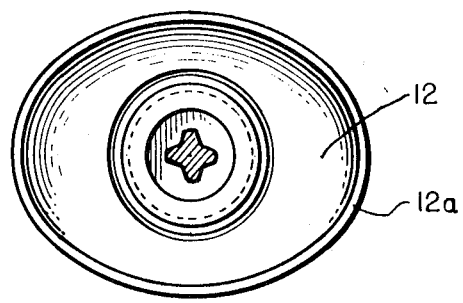
FIG. 2 is a plan view of the handle of this invention, looking upward as shown by line 2—2 of FIG. 1.
Figure 3:
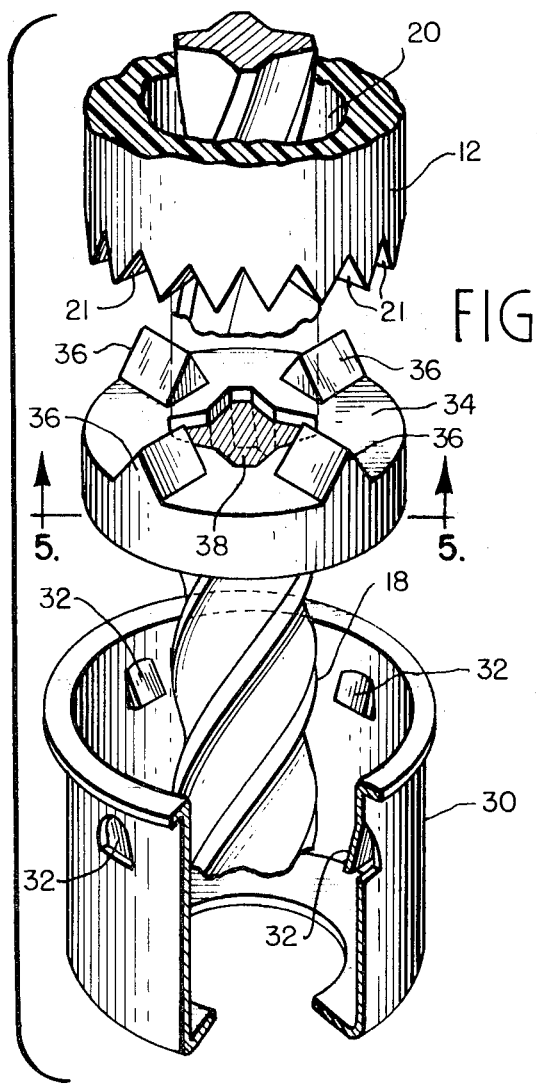
FIG. 3 is an enlarged, exploded view showing the fitting of the parts at the lower end of the handle of the beater.

As a preferred or exemplary embodiment of the present invention, the drawings illustrate generally a beater 10 having a reciprocatory drive handle 12 housing a rotatable drive shaft 14. The handle 12 has a flaring outer skirt 12a which provides a comfortable grip during operation of the beater. The drive shaft 14, in turn, carries a mixing element 16 at its opposite free end. The drive shaft 14 is spirally formed about the major portion 18 of its upper length. The handle 12 includes a longitudinal bore 20 surrounded at its lower end by notches 21. The longitudinal bore 20 houses the upper end 18 of the shaft 14.

The assembly within the longitudinal bore 20 includes a spring 22, and a retainer 24 having a hollow recess 25 at each end. The upper end 18 of the shaft 14 terminates in a point 26 which abuts on a surface in one recess 25 of the retainer 24. The spring 22 abuts on a surface in the opposite recess 25 of the retainer 24 and thereby serves to return the handle to normal position after it has been pressed down on the shaft 14. Stop means 28 are provided in the upper end 18 of shaft 14 to limit its downward movement, as shown in FIG. 4.

The entire assembly is secured within the longitudinal bore 20 of handle 12, in accordance with the invention, by a ferrule 30 which is press-fitted over the handle 12 by means of a plurality of barbs 32 which bite into the handle 12 when the ferrule 30 is forced thereon. A bearing 34 having teeth 36 is held firmly against the lower end of the handle 12 by the ferrule 30. The teeth 36 formed on the upper face of the bearing 34 engage the notches 21 at the lower end of the handle 12 preventing rotation of the bearing 34. The bearing 34 is formed with an aperture 38 corresponding roughly to the cross-sectional shape of the upper end 18 of the drive shaft 14. As an alternate method of securing the ferrule 30 to the handle 12, the ferrule 30 may be formed other than circular, such as the polygonal ferrule shown in FIGS. 7 and 8. The flat portions 39 of the ferrule form a tight friction fit on the lower end of the handle 12 when the ferrule is forced onto the handle.

At the lower end of the shaft 14 is press-fitted a mixing element 16 having a plurality of fingers 42 radiating from a central hub 44. Each of the fingers 42 extends first generally horizontally from hub 44 and then curves upwardly. The preferred embodiment in the drawings shows each of the fingers terminating in a substantially vertical portion 46. However, other shapes at the top free ends of the fingers 42 could be just as effective. For example, the finger could curve inwardly or outwardly after extending upwardly as shown. The important feature is that the finger 42 terminates in a free end and does not rejoin the shaft 14. Each finger is preferably V-shaped as shown in cross section in FIG. 6. Knurls 40 at the lower end of shaft 14 prevent slippage of the shaft 14 within the beater element 16.

A rounded knob 48 is formed at the base of the hub 44 to minimize friction between the mixing element 16 and the receptacle (not shown) when the beater 10 is operated.

In operation the handle 12 is manually depressed with one hand, the spring 22 compressing to permit such action. The handle 12 and the bearing 34 are held nonrotatable The spirally formed upper end 18 of the shaft 14 passes through the aperture 38 in the bearing 34 and imparts to the shaft 14 and thus to the mixing element 16 a rotating motion. The velocity of rotating is proportional to the speed of the downward thrust on the handle 12 and the pitch of the spiral.

When pressure on the handle 12 is relieved, the spring 22 operates to lift handle 12, or to maintain pressure on the receptacle while the handle 12 is being lifted by the operator. Rotation, then, is in opposite direction to that during depression of handle 12. Subsequent reciprocating motions on the handle 12 impart corresponding rotating motions to the shaft 14 and the beater element 16.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A one-hand beater for mixing comestibles and the like comprising: A plastic handle having a substantially cylindrical longitudinal bore formed therein and a plurality of notches surrounding said bore at the lower end of said handle; a drive shaft rotatably mounted in said bore, said drive shaft having a spirally shaped upper portion; a circular bearing member having an aperture corresponding to the transverse cross-sectional shape of said spirally shaped upper portion of said drive shaft, and a plurality of teeth formed on one side of said bearing member, each of said teeth being adapted to engage in a corresponding notch on said handle; a spring housed in the upper end of said bore; a retainer in abutting relationship between said spring and said shaft; a mixing element fixedly secured to the free end of said drive shaft; and a ferrule said ferrule surrounding the engagement of said notches of the handle, and said bearing member having a plurality of barbs protruding inwardly from said ferrule, said barbs engaging said lower end of said handle to prevent said ferrule from becoming loosened from said lower end of said handle once said ferrule has been pressed into a position to hold said teeth of said bearing in engagement with said corresponding notches of said handle thereby preventing rotation of said bearing when said spirally shaped upper portion of said drive shaft passes through said aperture and thereby causing a reciprocatory motion on said handle to impact a rotary motion to said drive shaft and said mixing element.

2. A beater as set forth in claim 1 wherein said mixing element comprises a plurality of relatively flexible plastic mixing fingers, each of said fingers first radiating outwardly from the bottom end of said mixing element, then curving upwardly and terminating in a substantially vertical direction.

* * * * *